United States Patent [19]

Brixy

[11] 3,956,936

[45] May 18, 1976

[54] TEMPERATURE-MEASURING SYSTEM
[75] Inventor: Heinz Brixy, Julich, Germany
[73] Assignee: Kernforschungsanlage Julich Gesellschaft mit beschrankter Haftung, Julich, Germany
[22] Filed: Dec. 26, 1973
[21] Appl. No.: 428,352

[30] Foreign Application Priority Data
Dec. 27, 1972 Germany............................ 2263469

[52] U.S. Cl. ............................ 73/359; 73/362 AR; 136/233
[51] Int. Cl.² .......................................... G01K 7/30
[58] Field of Search ........... 73/359, 362 AR, 343 R; 136/230, 232, 233; 338/30

[56] References Cited
UNITED STATES PATENTS
3,061,806 10/1962 Stevens................................. 73/359

FOREIGN PATENTS OR APPLICATIONS
272,609 9/1970 U.S.S.R.................................. 73/359

Primary Examiner—S. Clement Swisher
Assistant Examiner—Denis E. Coor
Attorney, Agent, or Firm—Karl F. Ross; Herbert Dubno

[57] ABSTRACT

A temperature-measuring system comprises a thermocouple connectable to a conventional temperature indicator (millivoltmeter) arrangement using the thermoelectric emf, and a length of noise-thermometer conductor (resistor) which is connectable to a noise-thermometer circuit whereby the thermocouple is connected to the noise-thermometer resistor. The system possesses advantages of both the thermoelectric temperature-measuring process and the noise-thermometer measuring process.

4 Claims, 4 Drawing Figures

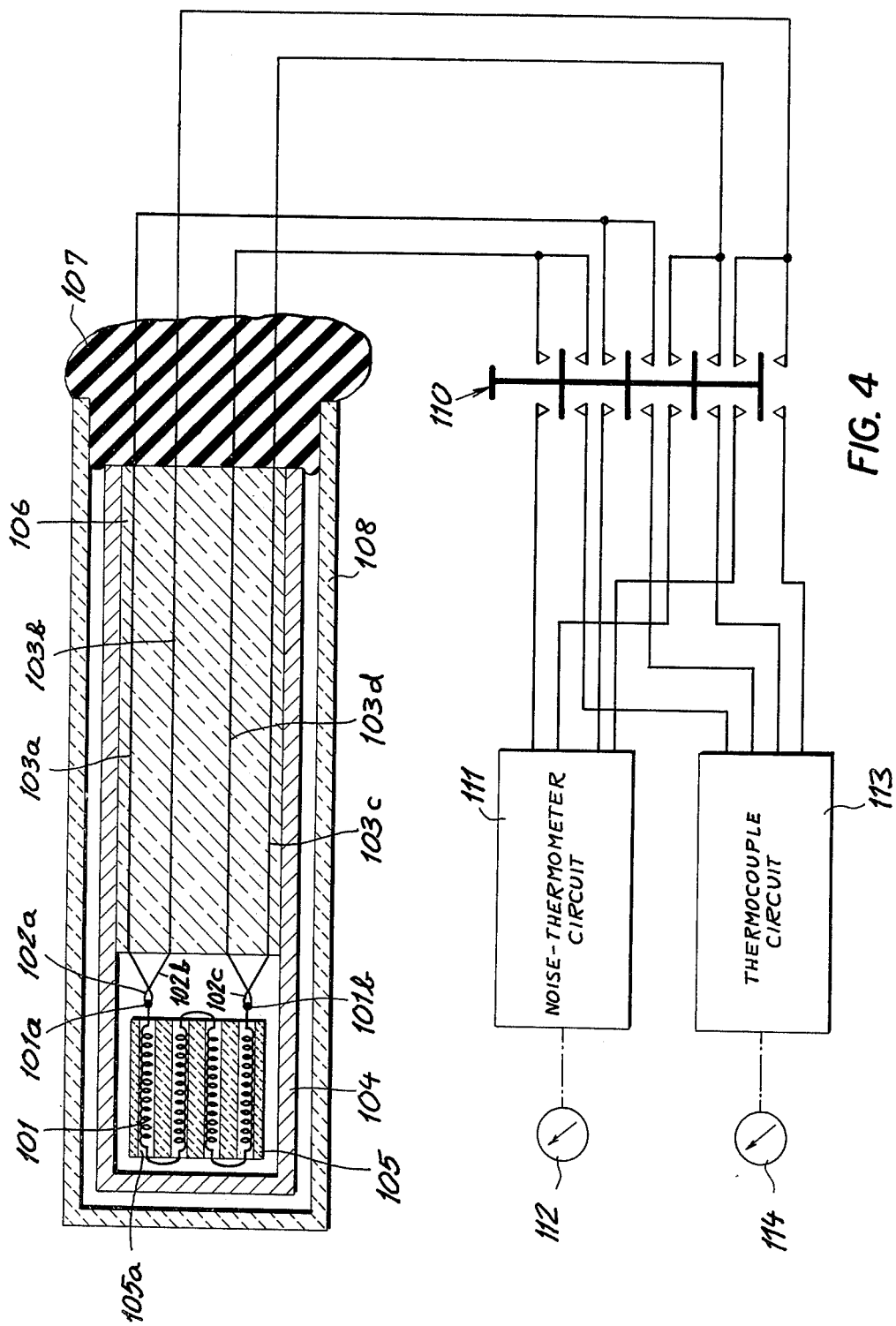

TEMPERATURE-MEASURING SYSTEM

CROSS-REFERENCE TO RELATED APPLICATIONS

The present application is related to the commonly owned copending applications Ser. Nos. 238,833 (now U.S. Pat. No. 3,818,761) and 238,834, both filed Mar. 28, 1972, and application Ser. No. 369,733 filed June 13 1973.

FIELD OF THE INVENTION

Our present invention relates to a temperature-measuring system and, more particularly, a system for measuring temperatures over a wide temperature range with greater accuracy than heretofore and utilizing principles of noise-temperature thermometers and thermoelectric temperature-measuring systems.

BACKGROUND OF THE INVENTION

For the measurement of temperatures, especially with electrical or electronic instruments, various basic principles have been employed. For example, it is known to measure temperatures by detecting the potential difference or emf produced by a junction of dissimilar metallic and/or semi-conductive temperature-sensitive elements such as thermocouples or thermopiles. Such systems produce an emf which is a function of temperature and may be used for a wide variety of temperature-measuring purposes.

However, when such thermoelements are employed for the measurement of temperatures above about 1000°C or when the measuring instruments or sensor is to be located in an environment which may be detrimental, the accuracy of the measurement leaves much to be desired and considerable error is introduced.

Apparently maintaining the dissimilar-metal junction at an elevated temperature for long periods varies the emf per °C which is generated by the system, perhaps as a result of interdiffusion of the metals, diffusion of impurities from a furnace atmosphere into the junction or like changes in the sensor. The prolonged exposure to high temperatures may also affect the leads or conductors and these disadvantages are observed, even when the system is enclosed in a ceramic sleeve.

As described in the above-identified applications, it has been proposed to avoid the disadvantages of conventional temperature-sensing systems by providing so-called noise thermometers which utilize a different principle. A noise-thermometer system utilizes a metallic strand, wire or film which generates an electrical output by thermal agitation of electrical changes within the conductor. The output is a noise voltage and is produced in the electrical conductor by such thermal agitation. Thermal noise, also known as JOHNSON noise, can be produced in a conductor even at temperatures approaching 0°K at which thermocouples become noticeably less efficient, and may be particularly suitable for the measurement of temperatures in the range of several hundred °K. The available thermal-noise power is proportional to the absolute temperature over the frequency band width over which the noise is measured, and described in the aforementioned applications. With a fixed band width, the available available thermal-noise power can be measured in terms of the noise voltage and is proportional to absolute temperature. The theory of such systems and various circuits utilizing the principles of JOHNSON noise and temperature measurement, are described in U.S. Pat. Nos. 2,710,899, 2,728,835, 2,768,266 and 2,884,786.

Frequently it is desirable to have available another temperature-measuring instrument with which a thermocouple can be calibrated with the aid of a noise thermometer or other temperature detector. For this reason two instruments are required and the introduction of both simultaneously to the measurement site may pose a problem. Furthermore, when reference to one and another indicator must be made repeatedly, the problem has been all but insurmountable with conventional systems.

OBJECTS OF THE INVENTION

The principal object of the present invention is to provide a system which combines the advantages of a thermolement, i.e., a thermocouple or thermopile operating with a junction of dissimilar metals, with the advantages of a noise thermometer and thereby to produce a system which enables temperature measurement of a particularly wide range at low cost and with high accuracy and allows one to check upon the accuracy of the results obtained.

SUMMARY OF THE INVENTION

This object, and others which will become apparent hereinafter, is attained in accordance with the present invention by providing a single housing and insulating assembly, at least one thermocouple or like thermoelement operating with a junction of dissimilar metals, formed with the usual conductors or leads and, a noise-temperature-measuring conductor connected to the leads of the thermocouple and preferably to the latter at its junction and returned by another conductor; circuit means selectively connects the thermocouple to a thermocouple temperature-measuring circuit and the noise-temperature sensor to a noise-thermometer circuit.

According to a preferred embodiment of the invention, the noise-temperature sensor is connected at one end to a conductive shell, tube or housing which encloses both the electrical resistor (noise-temperature sensor) and the thermoelement or thermocouple. Advantageously, two such thermocouples are provided with respective leads, and the noise-temperature-sensing resistor bridges the junctions of these two thermoelements.

Not only does the aforedescribed system provide the individual advantages of a noise thermometer and a thermocouple temperature sensor, but the overall system gives rise to new, useful and unexpected results which have not heretofore been obtainable. For temperature indication without concern for electrical disturbances in the system, the thermocouple is employed to provide an emf which may be rapidly and accurately converted into an indication of the temperature. To achieve this advantage the noise-temperature thermometer is used to calibrate the thermocouple and to check the determination of temperatures when using the thermocouple. The two sensors are so juxtaposed that differences in their operating temperature due to physical separation cannot occur, inasmuch as the noise-thermometer resistor is directly connected to the thermocouple junction.

Since a remote temperature measurement is possible, the parasitic effects resulting from long lengths of conductor can be canceled out or suppressed by utilizing the technique described in the aforementioned applications, especially since two conductors are provided for each thermocouple and may be used alternately to eliminate the variables resulting from such conductors.

The system according to the present invention thus has the advantage that the two conductors may be used as described in the aforementioned applications to eliminate the resistance effects of the conductors extending to and from the measuring head. The protective tube also forms a shield for the system.

When a single thermocouple is employed and the conductive path to the noise-temperature thermometer is returned through the conductive shell, tube or shield, the low resistance of the latter also renders the resistance of the return path negligible.

BRIEF DESCRIPTION OF THE DRAWING

The above and other objects, features and advantages of the present invention will become more readily apparent from the following description, reference being made to the accompanying drawing in which:

FIG. 4 is an axial cross-sectional view and block diagram illustrating other characteristics of the invention.

SPECIFIC DESCRIPTION

Figure 2:
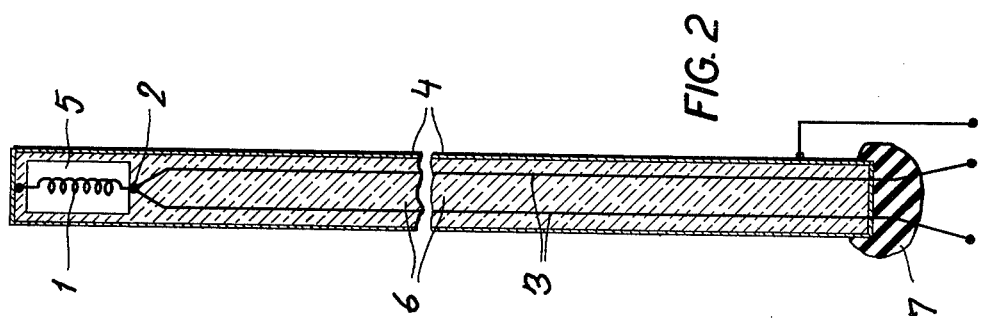
FIG. 2 is a diagrammatic section similar to FIG. 1, likewise using a single thermocouple.
Figure 1:
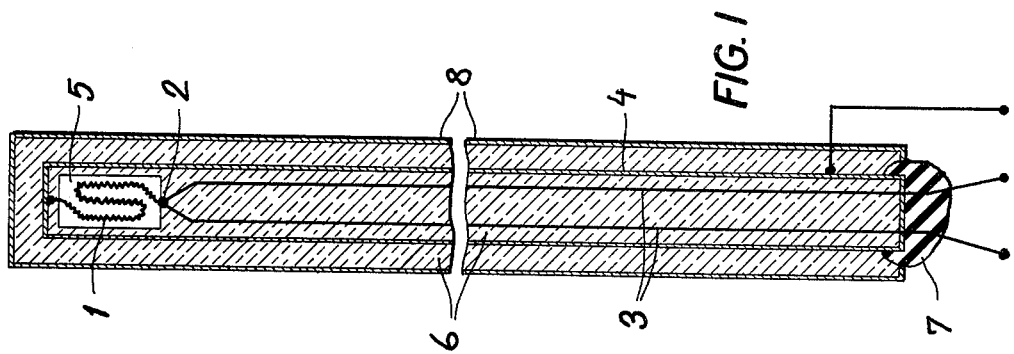
FIG. 1 is a diagram illustrating a temperature sensor according to the invention using a single thermocouple arrangement, the return path from the noise-temperature sensor extending through the conductive sheath enclosing the sensors.

In FIGS. 1 and 2 of the drawing, we have shown an embodiment of the invention in which a noise-thermometer resistor 1 is connected at one end to the junction or sensing point of a thermocouple 2 whose leads 3 extend through a protective tube or sheath 4.

The protective tube 4 is composed of conductive, preferably metallic, material and is most advantageously a metal designed to withstand the temperature range to which the device may be subject.

When the system is to be used for measuring high temperatures, as in an industrial furnace or a nuclear reactor, the protective metal tube 4 may be composed of a refractory metal or alloy. High melting point alloys of tungsten, especially tungsten-rhenium alloys, may be used, although tubes consisting of tungsten alone have also been found to be satisfactory.

In place of a metal tube, a conductive tube consisting of another refractory material, e.g. graphite, may be employed.

The protective tube 4 of FIGS. 1 and 2 serves as the return path for the electric current traversing the noise resistor 1 and is connected to one terminal of a measuring circuit of a noise-temperature thermometer. A suitable circuit may be that of application Ser. No. 369,733 or the applications and patent mentioned therein.

The other terminal of the noise-temperature circuit can be connected to one of the leads 3 of the thermocouple 2. The thermocouple leads 3 may be connectable to a thermocouple circuit, e.g. a system for converting the millivolt output of the thermocouple to a reading of degrees of the temperature. The noise resistor 1 is of spiral or meandering configuration, as diagrammatically illustrated in FIG. 2, and has also been described in Application Ser. No. 369,733 or the applications mentioned therein. Most advantageously, the noise resistor 1 extends through a multi-passage tube 5 of insulating material. The leads 3 of the thermocouple are imbedded in an insulator mass 6. The protective tube 4 is closed by a potting compound 7 of insulating material and can be received in an outer protective tube or cell 8 as shown for FIG. 1, the tube 8 being composed of a ceramic or other suitable material.

Figure 3:
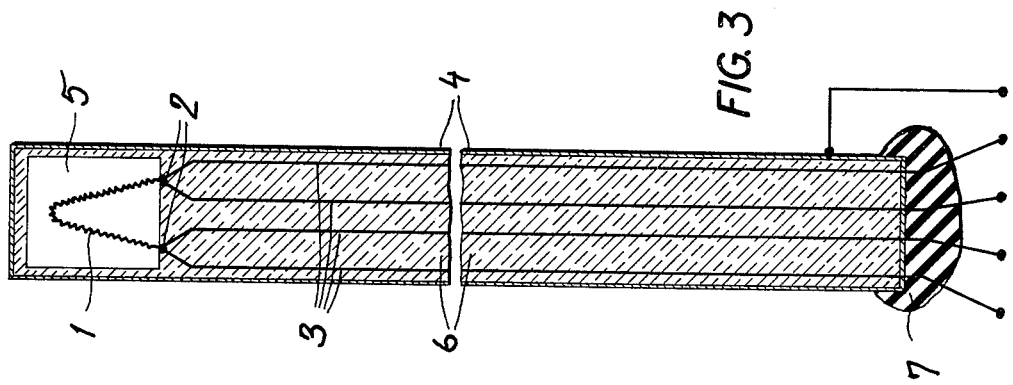
FIG. 3 is another diagrammatical axial section of a sensor using two thermocouples.

In the embodiment of FIG. 3, two thermocouples 2 have been shown, the junctions of these thermocouples being connected to opposite ends of a noise-temperature resistor, also represented at 1. In this case, the metal protective tube or sheath 4 constitutes an electrical shield. Instead of a shield of this type, a plurality of mutually coaxial nested tubes can be provided for shielding.

FIG. 4 shows a system of the latter type in somewhat more detail. From this embodiment it will be apparent that the tube 105 within the sheath 104 is formed with a plurality of channels 105a in which the coiled resistance wire 101 passes in a meander in alternately opposite axial directions. Thus a considerable length of noise-thermometer wire may be incorporated in the resistor 101 in a very limited space. One terminal 101a of the resistance wire is soldered to the junction 102a of an iron-constantan or other thermocouple 102b whose leads 103a and 103b extend through the ceramic insulating body 106 and the insulating potting compound 107, which retains the assembly in a ceramic tube 108. The other terminal 101b of the noise-temperature thermometer is connected to the junction of a thermocouple 102c whose leads 103c and 103d likewise extend out of the system.

A switch 110 has its contacts arranged to connect the leads of the thermocouples to the noise-thermometer circuit 111 (see application Ser. No. 369,733) whose output may be read from a temperature-display device represented diagrammatically at 112.

In the other position of switch 110. both leads of each thermocouple are connected to the thermocouple circuit 113 whose temperature-display device is shown at 114. The thermocouple circuit may be of the type described at Chapter 25, pp. 10 ff. of Perry's Chemical Engineers' Handbook, McGraw-Hill Book Co. 1963, while the thermocouples may be of the type described at pp. 22 – 6 ff. thereof.

We claim:

1. A temperature-measuring device comprising a circuit having an insulating portion, a noise-temperature resistor mounted on said insulating portion, a thermocouple having a junction connected to one end of said resistor and a pair of leads, and circuit means for selectively connecting said leads to a thermocouple temperature-indicating circuit to measure the temperature of said resistor and for selectively connecting both said leads and the other end of said resistor to a noise-temperature-measuring circuit for temperature measurement by said resistor, said circuit including a protective tube composed of metal, said resistor and said thermocouple being disposed within said tube, said other end of said resistor being electrically connected to said tube and said tube serving as a conductor for connecting said resistor to said noise-thermometer temperature-measuring circuit.

2. A temperature-measuring device comprising, in combination, a body having an insulating portion, a noise-temperature resistor mounted on said insulating portion, a thermocouple having a junction connected to one end of said resistor and a pair of leads connected to branches of the thermocouple and extending out of said body, a thermocouple temperature-indicating circuit; a noise-thermometer temperature-measuring circuit; and circuit means for selectively connecting said leads to said thermocouple temperature-indicating circuit for measuring the temperature of said resistor and for selectively connecting both said leads and the other end of said resistor to said noise thermometer temperature-measuring circuit for temperature measurement by said resistor.

3. A temperature-measuring device comprising, in combination, a body having an insulating portion, a noise-temperature resistor mounted on said insulating portion, a thermocouple having a junction connected to one end of said resistor and a pair of leads connected to branches of the thermocouple and extending out of said body; a thermocouple temperature-indicating circuit; a noise-thermometer temperature-measuring circuit; circuit means for selectively connecting said leads to said thermocouple temperature-indicating circuit for measuring the temperature of said resistor and for selectively connecting both said leads and the other end of said resistor to said noise thermometer temperature-measuring circuit for temperature measurement by said resistor; and a protective metal tube surrounding said body, said thermocouple and said resistor.

4. A temperature-measuring device, comprising, in combination, a body having an insulating portion, a noise-thermometer resistor mounted on said insulating portion, a respective thermocouple connected to each end of said noise-temperature resistor at a respective thermocouple junction, each of said thermocouples having a pair of branches, and respective pairs of leads connected to the branches of each of said thermocouples; thermocouple temperature-indicating circuit; a noise-thermometer temperature measuring circuit; and circuit means for selectively connecting both of said pairs of leads to said thermocouple temperature-indicating circuit to measure the temperature of said resistor and for selectively connecting said leads in pairs to opposite terminals of said noise-thermometer temperature-measuring circuit for temperature measurement by said resistor.

* * * * *